(12) United States Patent
Wei et al.

(10) Patent No.: US 11,422,336 B2
(45) Date of Patent: Aug. 23, 2022

(54) PROJECTION LENS AND PROJECTION DEVICE

(71) Applicant: Coretronic Corporation, Hsin-Chu (TW)

(72) Inventors: Ching-Chuan Wei, Hsin-Chu (TW); Yi-Chin Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 44 days.

(21) Appl. No.: 17/010,829

(22) Filed: Sep. 3, 2020

(65) Prior Publication Data

US 2021/0072498 A1 Mar. 11, 2021

(30) Foreign Application Priority Data

Sep. 11, 2019 (CN) .......................... 201921508984.9

(51) Int. Cl.
*G02B 9/12* (2006.01)
*G03B 21/28* (2006.01)
*G02B 13/18* (2006.01)

(52) U.S. Cl.
CPC .............. *G02B 9/12* (2013.01); *G02B 13/18* (2013.01); *G03B 21/28* (2013.01)

(58) Field of Classification Search
CPC .......... G02B 13/16; G02B 13/18; G02B 9/12; G02B 9/64; G03B 21/28
See application file for complete search history.

(56) References Cited

U.S. PATENT DOCUMENTS

| 7,009,765 B2 | 3/2006 | Gohman |
| 7,821,722 B2* | 10/2010 | Chou .................... G02B 13/04 359/680 |
| 8,786,960 B2 | 7/2014 | Lin et al. |
| 2005/0286136 A1* | 12/2005 | Masubuchi ........... G02B 13/16 359/651 |
| 2006/0176576 A1* | 8/2006 | Nagahara .............. G02B 13/16 359/680 |
| 2008/0068564 A1* | 3/2008 | Abe ...................... G03B 21/147 348/E9.027 |
| 2010/0259839 A1* | 10/2010 | Lu .......................... G02B 13/16 359/792 |
| 2014/0340769 A1* | 11/2014 | Shimada .............. G02B 13/006 359/754 |

(Continued)

FOREIGN PATENT DOCUMENTS

EP 2851728 3/2015
TW I454741 10/2014

*Primary Examiner* — Magda Cruz
(74) *Attorney, Agent, or Firm* — JCIPRNET (57) ABSTRACT

The disclosure proposes a projection lens including a first lens group, a second lens group and a third lens group arranged in sequence along an optical axis from a magnification side to a reduction side. The first lens group includes a plurality of lenses having refractive power. The second lens group includes at least one lens having refractive power. The third lens group includes a diaphragm, and a plurality of lenses having refractive power, wherein an intermediate image is formed between the first and third lens groups, and the refractive powers of the first, second and third lens groups are positive, positive, and positive, respectively. A projection device including the above projection lens is also proposed.

19 Claims, 8 Drawing Sheets

(56) References Cited

U.S. PATENT DOCUMENTS

| | | | |
|---|---|---|---|
| 2015/0036228 A1* | 2/2015 | Nagahara | H04N 9/317 |
| | | | 359/708 |
| 2015/0234159 A1* | 8/2015 | Nagahara | G02B 15/20 |
| | | | 359/680 |
| 2015/0241670 A1* | 8/2015 | Amano | G02B 13/04 |
| | | | 359/680 |
| 2019/0025561 A1* | 1/2019 | Imaoka | G02B 13/16 |
| 2019/0113715 A1* | 4/2019 | Li | G02B 13/00 |
| 2020/0257084 A1* | 8/2020 | Dai | G02B 13/0045 |

* cited by examiner

PROJECTION LENS AND PROJECTION DEVICE

CROSS-REFERENCE TO RELATED APPLICATION

This application claims the priority benefit of China application serial no. 201921508984.9, filed on Sep. 11, 2019. The entirety of the above-mentioned patent application is hereby incorporated by reference herein and made a part of this specification.

BACKGROUND

Technical Field

The disclosure relates to an optical lens and an optical device, and more particularly to a projection lens and a projection device.

Related Art

A current trend in projectors for education and home use is that the projectors are being developed to have high brightness and large projection screens. Thus, manufacturers are focused on designing a suitable wide-angle lens architecture with reduced weight and size while effectively reducing production costs. Under these considerations, most wide-angle lenses are designed as fixed-focus lenses. In general, in a wide-angle lens, to reduce lens size, an optical path is designed to form an intermediate image to reduce the whole optical path, thereby reducing an outer diameter of the whole lens. An optical system that forms an intermediate image has an overall length larger than that of an optical design without an intermediate image.

However, in the current technology, the lens has an excessive number of lenses and is therefore less competitive on the market in terms of price. In addition, an excessive length of the lens may affect the volume of the projector. Therefore, those skilled in the art are striving to design a lens in which an aspherical lens is placed in front of and behind an aperture diaphragm, and which is advantageous in terms of price, to meet the needs of the current projector market.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The disclosure provides a projection lens and a projection device, in which the number of lenses is reduced to reduce the length of the projection lens, and good optical quality is provided under the requirements of fixed focus and ultra short focus.

Other objectives and advantages of the disclosure may be further understood from the technical features disclosed in the disclosure.

To achieve one of, some of or all of the above objectives or other objectives, an embodiment of the disclosure proposes a projection lens including a first lens group, a second lens group and a third lens group arranged in sequence along an optical axis from a magnification side to a reduction side. The first lens group includes a plurality of lenses having refractive power. The second lens group includes at least one lens having refractive power. The third lens group includes a diaphragm, and a plurality of lenses having refractive power, wherein an intermediate image is formed between the first lens group and the third lens group, and the refractive powers of the first lens group, the second lens group and the third lens group are positive, positive, and positive, respectively.

To achieve one of, some of or all of the above objectives or other objectives, another embodiment of the disclosure proposes a projection device including an illumination system, at least one light valve, and a projection lens. The illumination system is configured to provide an illumination beam. The at least one light valve is disposed on a transmission path of the illumination beam and is configured to convert the illumination beam to an image beam. The projection lens is disposed on a transmission path of the image beam and is configured to convert the image beam to a projection beam. The projection lens includes a first lens group, a second lens group and a third lens group arranged in sequence along an optical axis from a magnification side to a reduction side. The first lens group includes a plurality of lenses having refractive power. The second lens group includes at least one lens having refractive power. The third lens group includes a diaphragm, and a plurality of lenses having refractive power, wherein an intermediate image is formed between the first lens group and the third lens group, and the refractive powers of the first lens group, the second lens group and the third lens group are positive, positive, and positive, respectively.

Based on the above, the embodiments of the disclosure at least have one of the following advantages or effects. In the projection lens and the projection device of the disclosure, the projection lens includes the first lens group, the second lens group, and the third lens group, and the refractive powers thereof are positive, positive, and positive, respectively. Therefore, the number of lenses can be effectively reduced to reduce the length of the projection lens. In addition, the projection lens enables the light emitted by the light valve to form the intermediate image between the first lens group and the third lens group. Therefore, good optical quality is provided under the requirements of fixed focus and ultra short focus.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
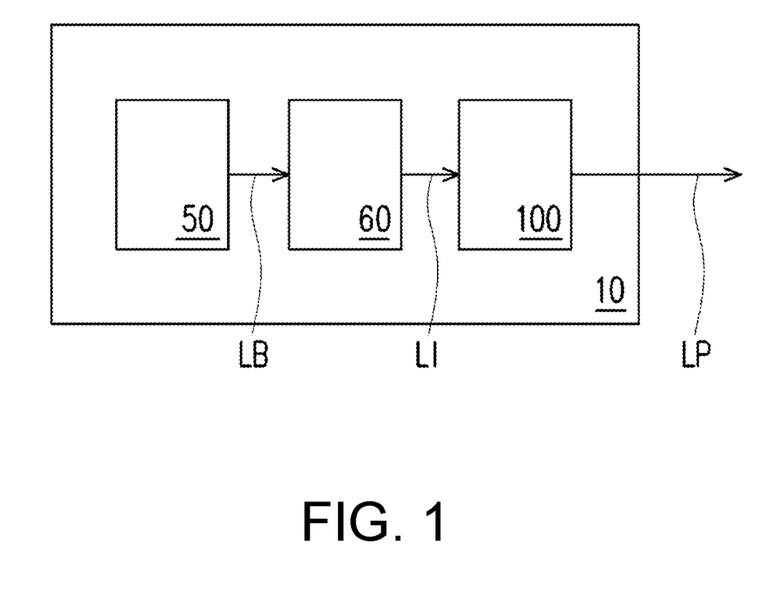
FIG. 1 is a schematic diagram of a projection device according to an embodiment of the disclosure.

FIG. 1 is a schematic diagram of a projection device according to an embodiment of the disclosure. Referring to FIG. 1, the embodiment provides a projection device 10 configured to provide a projection beam LP. The projection device 10 includes an illumination system 50, at least one light valve 60, and a projection lens 100. The illumination system 50 is configured to provide an illumination beam LB. The light valve 60 is disposed on a transmission path of the illumination beam LB and is configured to convert the illumination beam LB to an image beam LI. The projection lens 100 is disposed on a transmission path of the image beam LI and is configured to convert the image beam LI to the projection beam LP. The projection beam LP is projected onto a projection target (not shown) such as a screen or a wall surface.

The illumination system 50 includes, for example, a plurality of light emitting elements, a wavelength converting element, a light homogenizing element, a filter element, and a plurality of light splitting and combining elements, and is configured to provide light of different wavelengths as a source of image light. Among them, the plurality of light emitting elements are, for example, metal halide lamps, high pressure mercury lamps, or solid-state illumination sources such as light emitting diodes, laser diodes or the like. However, the disclosure does not limit the type or form of the illumination system 50 in the projection device 10, and detailed structure and implementation manner thereof will be omitted since sufficient teachings, suggestions and descriptions of implementation can be obtained from common knowledge in the art.

The light valve 60 is, for example, a reflective type light modulator, such as a liquid crystal on silicon (LCoS) panel, a digital micromirror device (DMD) or the like. In some embodiments, the light valve 60 may be, for example, a transmissive type light modulator, such as a transparent liquid crystal panel, an electro-optical modulator, a magneto-optic modulator, an acousto-optic modulator (AOM) or the like. The disclosure does not limit the form and type of the light valve 60. Detailed steps and implementation manners of a method for converting the illumination beam LB to the image beam LI by the light valve 60 will be omitted since sufficient teachings, suggestions and descriptions of implementation can be obtained from common knowledge in the art. In the embodiment, the number of the light valve 60 is one. For example, the projection device 10 uses a single DMD. However, in other embodiments, there may be a plurality of light valves 60, and the disclosure is not limited thereto.

The projection lens 100 is configured to project image light onto a projection target. The projection lens 100, for example, includes a set of one or more optical lenses having refractive power, such as a set of nonplanar lenses such as biconcave lenses, biconvex lenses, concave-convex lenses, convex-concave lenses, plano-convex lenses and plano-concave lenses, and so on. In some embodiments, the projection lens 100 may include a plane mirror or a curved mirror to project image light from the light valve 60 onto the projection target in a reflective manner.

Figure 2:
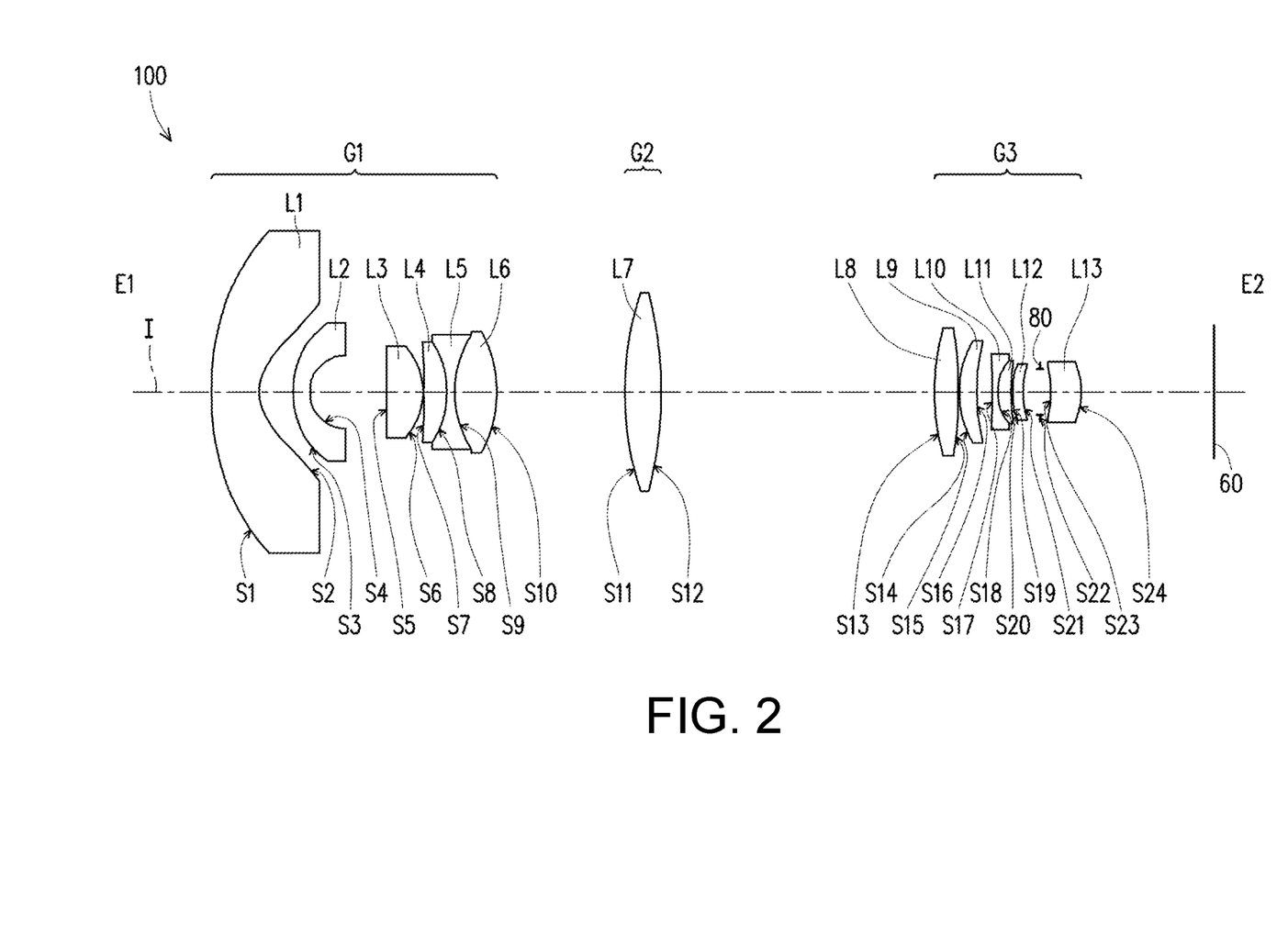
FIG. 2 is a schematic diagram of a projection lens according to an embodiment of the disclosure.

FIG. 2 is a schematic diagram of a projection lens according to an embodiment of the disclosure. Referring to FIG. 1 and FIG. 2, the projection lens 100 shown in FIG. 2 can be applied in at least the projection device 10 shown in FIG. 1. Therefore, the projection lens 100 applied in the projection device 10 of FIG. 1 will be described below as an example. However, the disclosure is not limited thereto. In the embodiment, the projection lens 100 includes a first lens group G1, a second lens group G2, and a third lens group G3 arranged in sequence along an optical axis I from a magnification side E1 to a reduction side E2. The magnification side E1 refers to a screen end, and the reduction side E2 refers to an image source end (light valve 60). In other words, a direction in which the projection lens 100 faces the magnification side E1 is a transmission direction of the projection beam LP, and a direction in which the projection lens 100 faces the reduction side E2 points to the image source end (light source 60) of the projection lens 100.

The projection lens 100 is a fixed-focus lens and has a throw ratio of less than or equal to 0.4. In other words, the projection lens 100 is an ultra short throw lens. In addition, the number of lenses having refractive power in the projection lens 100 is smaller than or equal to 15. In detail, the first lens group G1 includes a plurality of lenses having refractive power, the second lens group G2 includes at least one lens having refractive power, and the third lens group G3 includes a diaphragm 80 and a plurality of lenses having refractive power. The refractive powers of the first lens group G1, the second lens group G2, and the third lens group G3 are positive, positive, and positive, respectively.

The first lens group G1 includes at least one aspheric lens, and the first lens group G1 includes a triple cemented lens. In the embodiment, the first lens group G1 includes a first lens L1, a second lens L2, a third lens L3, a fourth lens L4, a fifth lens L5, and a sixth lens L6 arranged in sequence along the optical axis I from the magnification side E1 to the reduction side E2. The refractive powers of the first lens L1 to the sixth lens L6 are negative, negative, positive, positive, negative, and positive, respectively. Among them, the fourth lens L4, the fifth lens L5 and the sixth lens L6 contribute a hybrid lens, that is, the triple cemented lens. The first lens L1 and the third lens L3 are aspheric lenses. Therefore, the number of lenses can be effectively reduced to reduce the length of the projection lens 100, and aberration can be reduced.

The second lens group G2 may be composed of a single lens or a plurality of lenses. In the embodiment, the second lens group G2 includes a seventh lens L7. That is, the number of the at least one lens having refractive power in the second lens group G2 is one. The refractive power of the seventh lens L7 is positive. When a distance between the magnification side E1 and the projection lens 100 changes, the focus can be adjusted by changing a distance between the first lens group G1 and the second lens group G2.

The third lens group G3 includes at least one aspheric lens. In the embodiment, the number of the at least one aspheric lens is one, and the aspherical lens is a lens closest to the diaphragm 80 and having refractive power. In the embodiment, the third lens group G3 includes an eighth lens L8, a ninth lens L9, a tenth lens L10, an eleventh lens L11, a twelfth lens L12, and a thirteenth lens L13 arranged in sequence along the optical axis I from the magnification side E1 to the reduction side E2. The refractive powers of the eighth lens L8 to the thirteenth lens L13 are positive, positive, negative, positive, positive, and positive, respectively. Among them, the tenth lens L10 and the eleventh lens L11 contribute a hybrid lens, for example, a double cemented lens. The thirteenth lens L13 is an aspheric lens. Therefore, the number of lenses can be effectively reduced to reduce the length of the projection lens 100, and aberration can be reduced. In addition, when the projection lens 100 is focusing, the third lens group G3 is fixed.

It is worth mentioning that in the embodiment, an intermediate image (not shown) is formed between the first lens group G1 and the third lens group G3. For example, in the embodiment, the intermediate image is located between the second lens group G2 and the third lens group G3. However, in some embodiments, the intermediate image may be located between the first lens group G1 and the second lens group G2, and the disclosure is not limited thereto. Further, the projection lens 100 may have a non-telecentric property, that is, a diffusion angle of a beam (i.e., the image beam LI provided by the light valve 60) entering the projection lens 100 is, for example, greater than or equal to 5 degrees, but the disclosure is not limited thereto. In other words, a chief ray is substantially non-parallel between the second lens group G2 and the third lens group G3. Therefore, an optical effect of secondary imaging can be achieved using the projection lens 100, and the throw ratio thereof can be less than or equal to 0.4.

In the embodiment, the projection lens 100 satisfies 0.62>DLT1/DLT2>0.2, wherein DLT1 is the distance from the first lens group G1 to the second lens group G2, and DLT2 is a distance from the second lens group G2 to the third lens group G3. Specifically, DLT1 is a linear distance on the optical axis I from a surface in the first lens group G1 that is closest to the second lens group G2 to a surface in the second lens group G2 that is closest to the first lens group G1, and DLT2 is a linear distance on the optical axis I from a surface in the second lens group G2 that is closest to the third lens group G3 to a surface in the third lens group G3 that is closest to the second lens group G2. In addition, the projection lens 100 also satisfies 0.4>EFLG1/EFLG3>0.3, wherein EFLG1 is an equivalent focal length of the first lens group G1, and EFLG3 is an equivalent focal length of the third lens group G3. In addition, the projection lens 100 also satisfies 0.27>EFLG1/EFLG3>0.15, wherein EFLG1 is the equivalent focal length of the first lens group G1, and EFLG2 is an equivalent focal length of the second lens group G2.

Data of an embodiment of the fixed-focus projection lens 100 are set forth below in Table 1 to Table 2. However, the data set forth below are not intended to limit the disclosure. Any person skilled in the art may refer to the disclosure and make appropriate changes to parameters or settings thereof and the changes should still fall within the scope of the disclosure.

In the embodiment, the actual design of each of the aforesaid elements is shown in Table 1 below.

TABLE 1

| Element | Surface | Type | Radius of curvature (mm) | Distance (mm) | Refractive index (Nd) | Abbe number (Vd) |
|---|---|---|---|---|---|---|
| L1 | S1 | Aspherical | 54.91 | 8.57 | 1.52 | 56.28 |
|  | S2 | Aspherical | 8.12 | 6.07 |  |  |
| L2 | S3 | Spherical | 15.67 | 3 | 1.76 | 26.9 |
|  | S4 | Spherical | 6.56 | 13.79 |  |  |
| L3 | S5 | Aspherical | 756.87 | 6.6 | 1.69 | 55.5 |
|  | S6 | Aspherical | −10.49 | 0.2 |  |  |
| L4 | S7 | Spherical | −126.06 | 4.06 | 1.77 | 49.6 |
| L5 | S8 | Spherical | −16.77 | 1.5 | 1.83 | 24.2 |
| L6 | S9 | Spherical | 19.79 | 7.51 | 1.59 | 63.2 |
|  | S10 | Spherical | −23.01 | 23.06 |  |  |
| L7 | S11 | Spherical | 56.85 | 6.51 | 1.85 | 23.8 |
|  | S12 | Spherical | −70.35 | 49.18 |  |  |
| L8 | S13 | Spherical | 41.07 | 4.32 | 1.77 | 49.6 |
|  | S14 | Spherical | −66.24 | 0.2 |  |  |
| L9 | S15 | Spherical | 18.37 | 3.08 | 1.83 | 26.9 |
|  | S16 | Spherical | 35.97 | 2.78 |  |  |
| L10 | S17 | Spherical | −126.66 | 1 | 1.78 | 26.1 |
| L11 | S18 | Spherical | 8.66 | 2.43 | 1.55 | 70.3 |
|  | S19 | Spherical | 40.52 | 0.2 |  |  |
| L12 | S20 | Spherical | 13.28 | 1.91 | 1.92 | 18.9 |
|  | S21 | Spherical | 16.79 | 3.09 |  |  |
| 80 | S22 | Diaphragm | Infinite | 1.89 |  |  |
| L13 | S23 | Aspherical | −26.47 | 5.45 | 1.77 | 49.6 |
|  | S24 | Aspherical | −13.80 | 21.82 |  |  |

In Table 1, the first lens L1 has a surface S1 and a surface S2 from the magnification side E1 to the reduction side E2, and the second lens L2 has a surface S3 and a surface S4 in sequence from the magnification side E1 to the reduction side E2. The rest may be deduced in the same way, and a repeated description of the surfaces to which each element corresponds will be omitted. Further, in Table 1, "distance" refers to a distance on the optical axis I between two adjacent surfaces. For example, a distance corresponding to the surface S1 refers to a distance on the optical axis I between the surface S1 and the surface S2, a distance corresponding to the surface S2 refers to a linear distance on the optical axis I between the surface S2 and the surface S3, and the rest may be deduced in the same way. In the embodiment, DLT1 mentioned above is a linear distance on the optical axis I from a surface S10 of the sixth lens L6 to a surface S11 of the seventh lens L7, that is, 23.06 mm; DLT2 mentioned above is a linear distance on the optical axis I from a surface S12 of the seventh lens L7 to a surface S13 of the eighth lens L8, that is, 49.18 mm. In this way, DLT1/DLT2 is approximately 0.47, which is in accordance with 0.62>DLT1/DLT2>0.2.

In the embodiment, the surfaces S1 and S2 of the first lens L1, the surfaces S5 and S6 of the third lens L3, and the surfaces S23 and S24 of the thirteenth lens L13 are aspherical, and the surfaces of the remaining lenses are all spherical. A formula of an aspherical surface is as follows:

$$x = \frac{c'y^2}{1 + \sqrt{1 - (1+K)c'^2 y^2}} + Ay^2 + Ay^4 + By^6 + Cy^8 + Dy^{10} + Ey^{12} + Fy^{14} + Gy^{16} \ldots$$

In the above formula, X is an offset amount (sag) in an optical axis direction. c' is the reciprocal of a radius of an osculating sphere, that is, the reciprocal of a radius of curvature near the optical axis; K is a conic constant; and y is a height of the aspherical surface, that is, a height from the center of a lens to an edge of the lens. A to G respectively represent aspheric coefficients of different orders in the aspheric polynomial. Table 2 sets forth parameter values of the surfaces S1 and S2 of the first lens L1, the surfaces S5 and S6 of the third lens L3, and the surfaces S23 and S24 of the thirteenth lens L13.

TABLE 2

|   | S1 | S2 | S5 |
|---|---|---|---|
| K | 0.00E+00 | −1.06E+00 | 3.7618 |
| A | 2.44E−06 | −1.70E−05 | 4.99E−05 |
| B | 3.75E−10 | −4.58E−07 | −4.23E−07 |
| C | 1.29E−12 | 1.50E−09 | 9.93E−09 |
| D | −1.16E−15 | −1.53E−12 | −4.40E−11 |
| E | 0 | 0 | −1.87E−14 |
| F | 0 | 0 | 0 |

|   | S6 | S23 | S24 |
|---|---|---|---|
| K | 0.00E+00 | 30.76 | 4.976 |
| A | 1.22E−04 | −1.41E−04 | −2.41E−05 |
| B | 4.53E−07 | 8.33E−08 | −3.78E−07 |
| C | 1.52E−08 | −3.62E−08 | 7.98E−09 |
| D | −1.90E−10 | 1.36E−09 | −3.72E−11 |
| E | 1.82E−12 | −1.38E−15 | −1.61E−13 |
| F | 0 | −7.01E−19 | −7.05E−19 |

Figure 3:
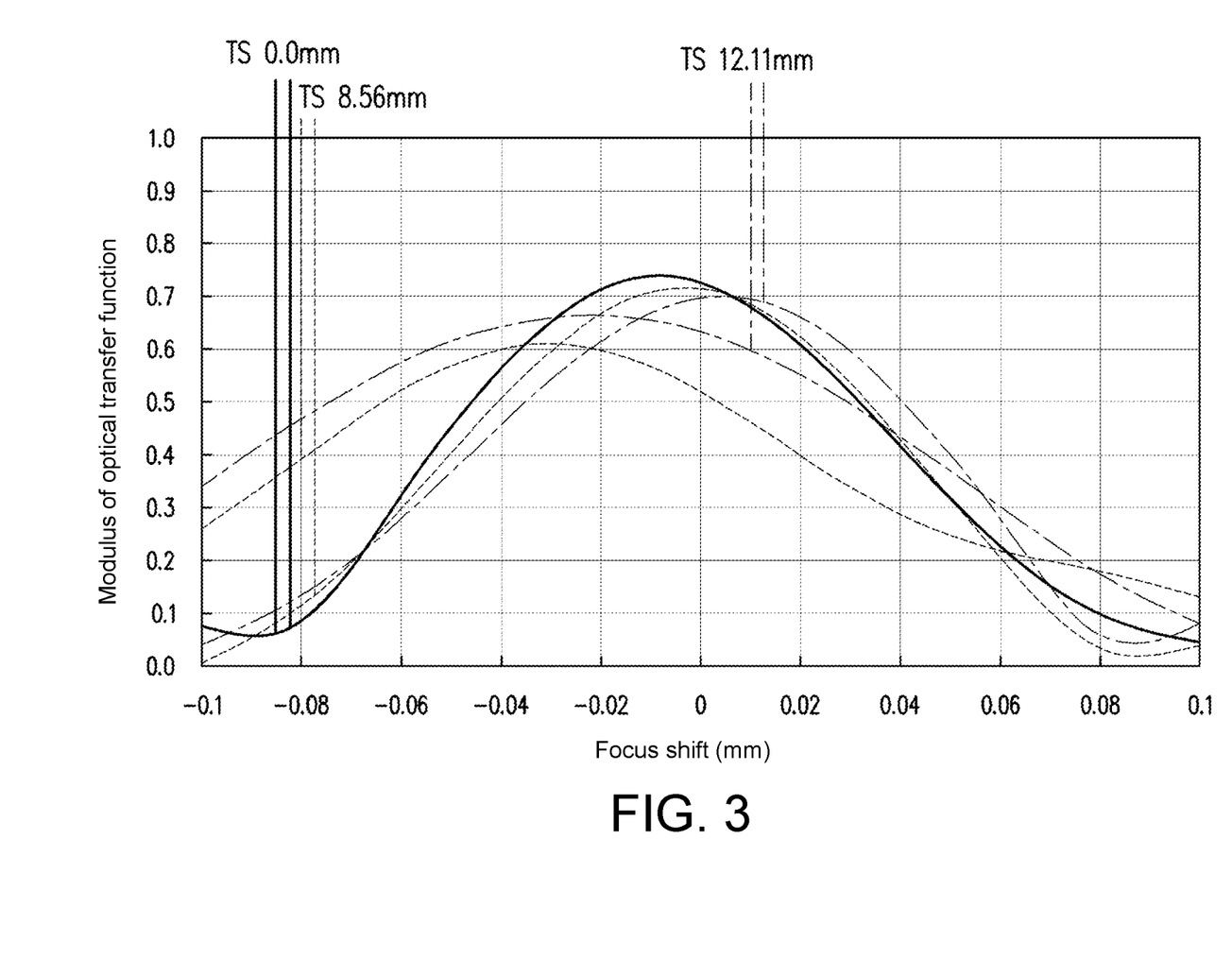
FIG. 3 is a diagram illustrating modulation transfer functions of the projection lens of FIG. 2.
Figure 4A:
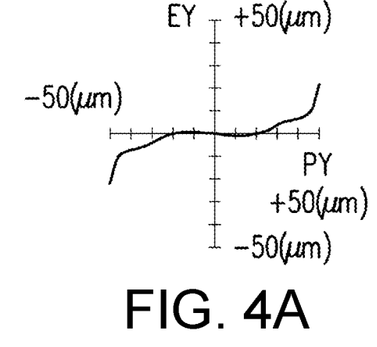
FIG. 4A to FIG. 4F are ray fan plots of the projection lens of FIG. 2.
Figure 4B:
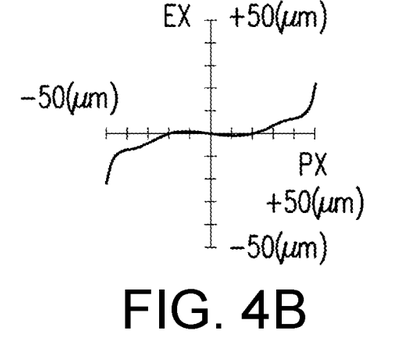
Figure 4C:
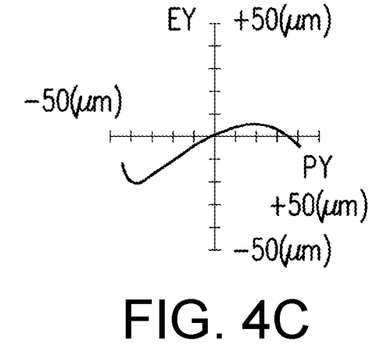
Figure 4D:
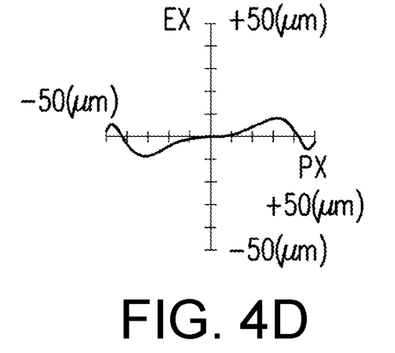
Figure 4E:
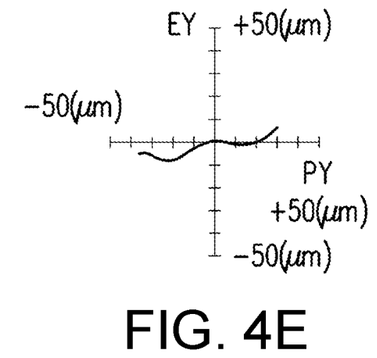
Figure 4F:
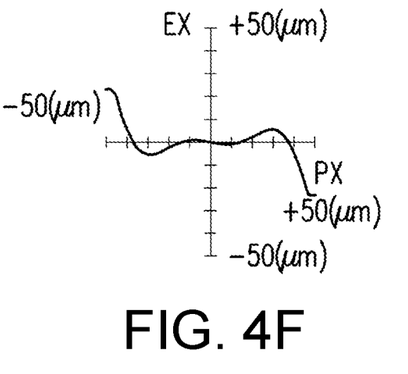

FIG. 3 is a diagram illustrating modulation transfer functions of the projection lens of FIG. 2. Referring to FIG. 3, FIG. 3 shows modulation transfer functions (MTFs) of the projection lens 100 at different image heights, wherein the horizontal axis indicates focus shift, the vertical axis indicates modulus of an optical transfer function, T represents curve in the meridional direction, S represents curve in the sagittal direction, and a value indicated next to "TS" represents image height. Thus, it can be verified that an optical transfer function curve shown by the projection lens 100 of the embodiment is within a standard range, and good optical imaging quality is provided, as shown in FIG. 3.

FIG. 4A to FIG. 4F are ray fan plots of the projection lens of FIG. 2. Referring to FIG. 4A to FIG. 4F, FIG. 4A to FIG. 4F are ray fan plots of the projection lens 100 at different image heights, wherein maximum and minimum scales of EX, EY, PX, and PY axes are +50 micrometers (μm) and −50 μm, respectively. Patterns shown in FIG. 4A to FIG. 4F all fall within a standard range, whereby it can be verified that the projection lens 100 of the embodiment achieves good optical imaging quality.

Figure 5:
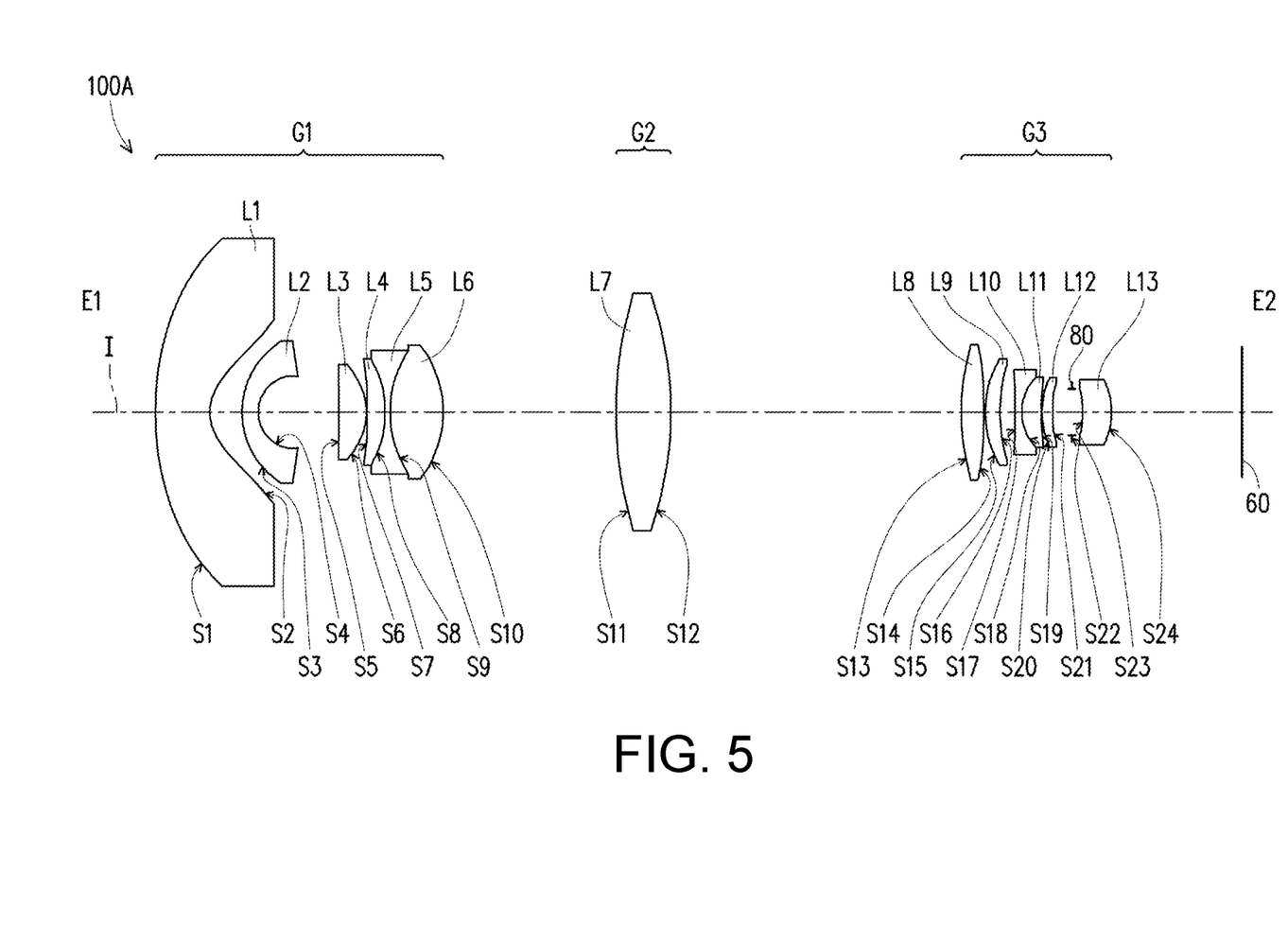
FIG. 5 is a schematic diagram of a projection lens according to another embodiment of the disclosure.

FIG. 5 is a schematic diagram of a projection lens according to another embodiment of the disclosure. Referring to FIG. 5, a projection lens 100A shown in FIG. 5 can at least replace the projection lens 100 shown in FIG. 1. Therefore, the projection lens 100A applied in the projection device 10 of FIG. 1 will be described below as an example. However, the disclosure is not limited thereto. The projection lens 100A of the embodiment is similar to the projection lens 100 illustrated in FIG. 2. A difference between these two is that in the embodiment, an intermediate image is located between the first lens group G1 and the second lens group G2. Further, the projection lens 100A may have a non-telecentric property, that is, a diffusion angle of a beam (i.e., the image beam LI provided by the light valve 60) entering the projection lens 100A is, for example, greater than or equal to 5 degrees, but the disclosure is not limited thereto. In other words, a chief ray is substantially non-parallel between the first lens group G1 and the second lens group G2. Therefore, the optical effect of secondary imaging can be achieved using the projection lens 100A, and a throw ratio thereof can be less than or equal to 0.4.

Data of an embodiment of the fixed-focus projection lens 100A are set forth below in Table 3 to Table 4. However, the data set forth below are not intended to limit the disclosure. Any person skilled in the art may refer to the disclosure and make appropriate changes to parameters or settings thereof and the changes should still fall within the scope of the disclosure.

In the embodiment, the actual design of each of the aforesaid elements is shown in Table 3 below.

TABLE 3

| Element | Surface | Type | Radius of curvature (mm) | Distance (mm) | Refractive index (Nd) | Abbe number (Vd) |
|---|---|---|---|---|---|---|
| L1 | S1 | Aspherical | 57.27 | 10.00 | 1.52 | 56.28 |
|  | S2 | Aspherical | 8.20 | 5.91 |  |  |
| L2 | S3 | Spherical | 15.44 | 3.00 | 1.75 | 27.5 |
|  | S4 | Spherical | 6.8 | 14.9 |  |  |
| L3 | S5 | Aspherical | −155.16 | 5.04 | 1.69 | 55.5 |
|  | S6 | Aspherical | −10.38 | 0.20 |  |  |
| L4 | S7 | Spherical | −77.48 | 3.18 | 1.77 | 4.96E+01 |
| L5 | S8 | Spherical | −20.71 | 1 | 1.83 | 25 |
| L6 | S9 | Spherical | 20.79 | 9.76 | 1.6 | 62.8 |
|  | S10 | Spherical | −20.51 | 32 |  |  |
| L7 | S11 | Spherical | 77.05 | 10 | 1.82 | 24.4 |
|  | S12 | Spherical | −66.69 | 53.72 |  |  |
| L8 | S13 | Spherical | 43.55 | 4.17 | 1.69 | 54.4 |
|  | S14 | Spherical | −64.84 | 0.2 |  |  |
| L9 | S15 | Spherical | 19.53 | 2.74 | 1.84 | 24.7 |
|  | S16 | Spherical | 34.68 | 2.74 |  |  |
| L10 | S17 | Spherical | −143.73 | 1.28 | 1.78 | 26.2 |
| L11 | S18 | Spherical | 9.44 | 3.58 | 1.55 | 69.3 |
|  | S19 | Spherical | 51.03 | 0.2 |  |  |
| L12 | S20 | Spherical | 15.61 | 1.85 | 1.92 | 18.9 |
|  | S21 | Spherical | 21.28 | 3.66 |  |  |
| 80 | S22 | Diaphragm | Infinite | 1.89 |  |  |
| L13 | S23 | Aspherical | −24.38 | 5.34 | 1.77 | 49.6 |
|  | S24 | Aspherical | −13.49 | 21.89 |  |  |

The descriptions in Table 3 are similar to those in Table 1 and will not be repeated herein. In the embodiment, DLT1 mentioned above is the linear distance on the optical axis I from the surface S10 of the sixth lens L6 to the surface S11 of the seventh lens L7, that is, 32 mm; DLT2 mentioned above is the linear distance on the optical axis I from the surface S12 of the seventh lens L7 to the surface S13 of the eighth lens L8, that is, 53.72 mm. In this way, DLT1/DLT2 is approximately 0.60, which is in accordance with 0.62>DLT1/DLT2>0.2.

Table 4 sets forth parameter values of the surfaces S1 and S2 of the first lens L1, the surfaces S5 and S6 of the third lens L3, and the surfaces S23 and S24 of the thirteenth lens L13.

TABLE 4

|   | S1 | S2 | S5 |
|---|---|---|---|
| K | 0.00E+00 | −1.06E+00 | 6.3214 |
| A | 1.63E−06 | −1.20E−05 | 4.86E−05 |
| B | 3.94E−10 | −4.66E−07 | −4.32E−07 |
| C | 8.82E−13 | 1.52E−09 | 7.53E−09 |
| D | −5.92E−16 | −1.59E−12 | −3.03E−11 |
| E | 0 | 0 | −1.88E−14 |
| F | 0 | 0 | 0 |

|   | S6 | S23 | S24 |
|---|---|---|---|
| K | 0.00E+00 | −4.542 | −9.879 |
| A | 1.22E−04 | −1.42E−04 | −2.78E−05 |
| B | 4.01E−07 | −3.54E−07 | −4.85E−07 |
| C | 1.55E−08 | −2.14E−08 | 8.14E−09 |
| D | −1.89E−10 | 5.99E−10 | −1.03E−10 |
| E | 1.82E−12 | −1.47E−15 | −1.61E−13 |
| F | 0 | −7.43E−19 | −7.51E−19 |

Figure 6:
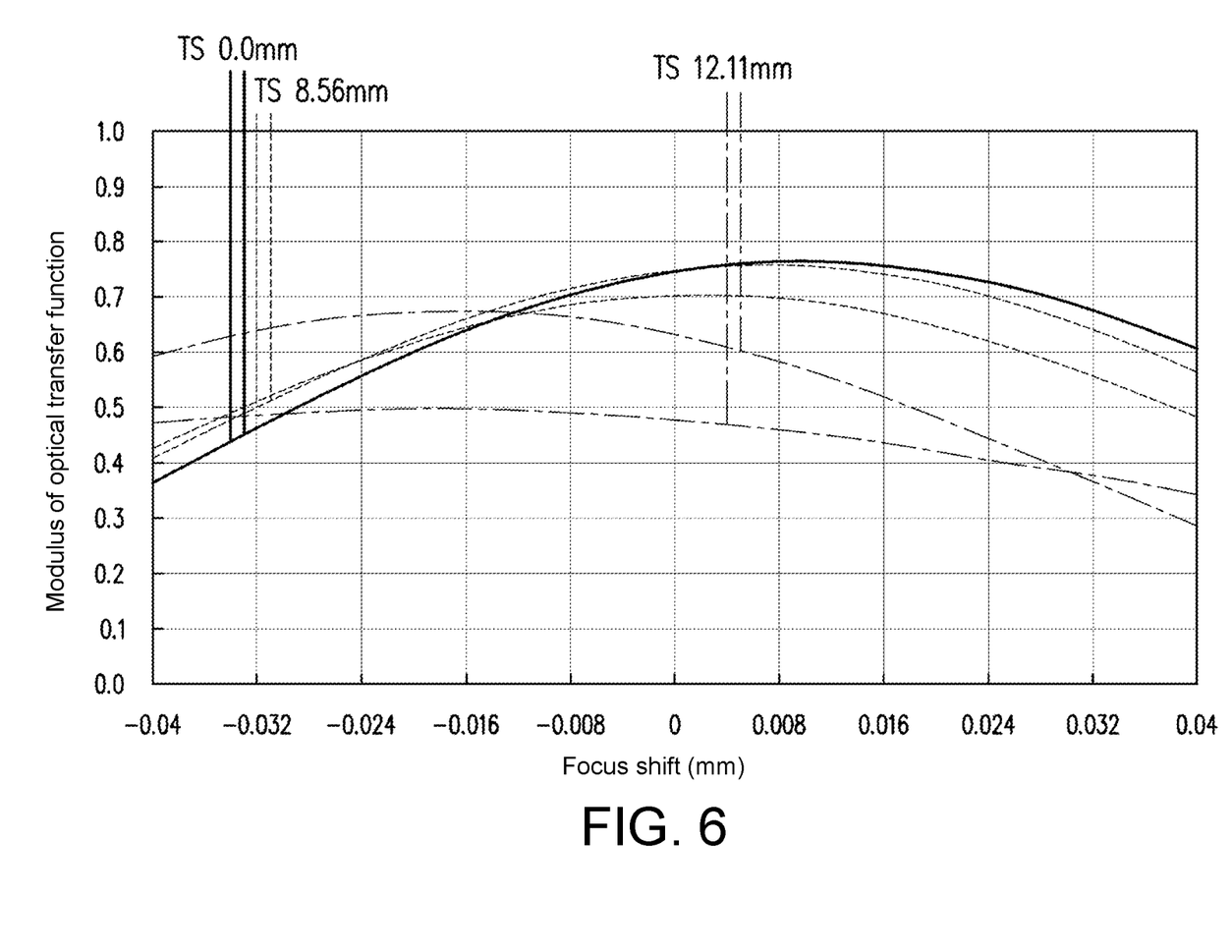
FIG. 6 is a diagram illustrating modulation transfer functions of the projection lens of FIG. 5.
Figure 7A:
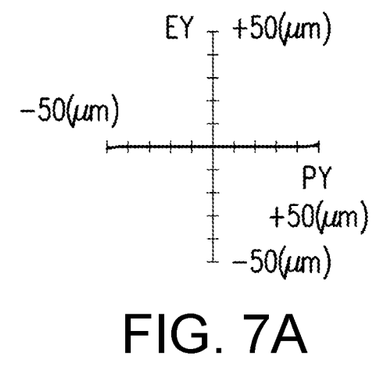
FIG. 7A to FIG. 7F are ray fan plots of the projection lens of FIG. 5.
Figure 7B:
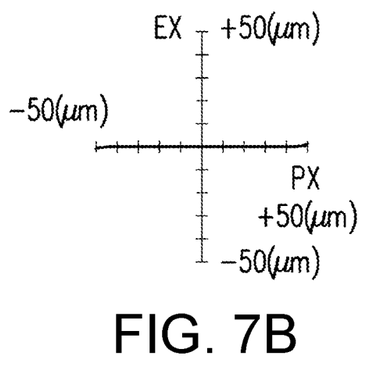
Figure 7C:
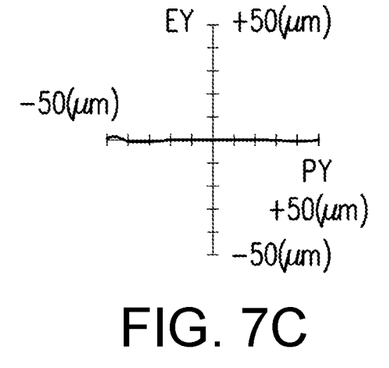
Figure 7D:
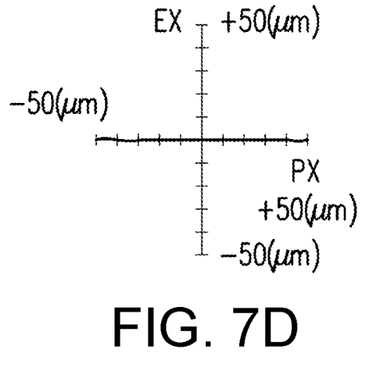
Figure 7E:
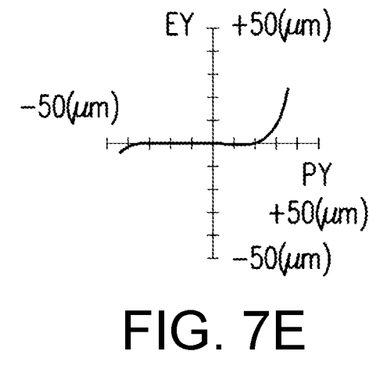
Figure 7F:
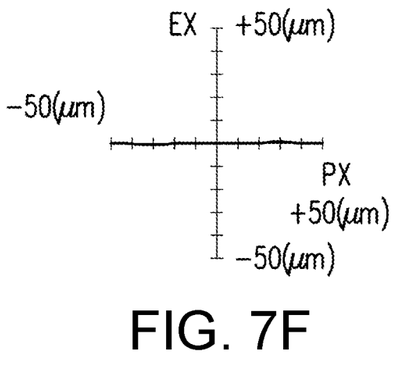

FIG. 6 is a diagram illustrating modulation transfer functions of the projection lens of FIG. 5. Referring to FIG. 6, FIG. 6 shows the MTFs of the projection lens 100A at different image heights. It can be verified from FIG. 6 that an optical transfer function curve shown by the projection lens 100A of the embodiment is within the standard range, and good optical imaging quality is provided, as shown in FIG. 6.

FIG. 7A to FIG. 7F are ray fan plots of the projection lens of FIG. 5. Referring to FIG. 7A to FIG. 7F, FIG. 7A to FIG. 7F are ray fan plots of the projection lens 100A at different image heights. Thus, it can be verified that the projection lens 100A of the embodiment achieves good optical imaging quality.

Figure 8:
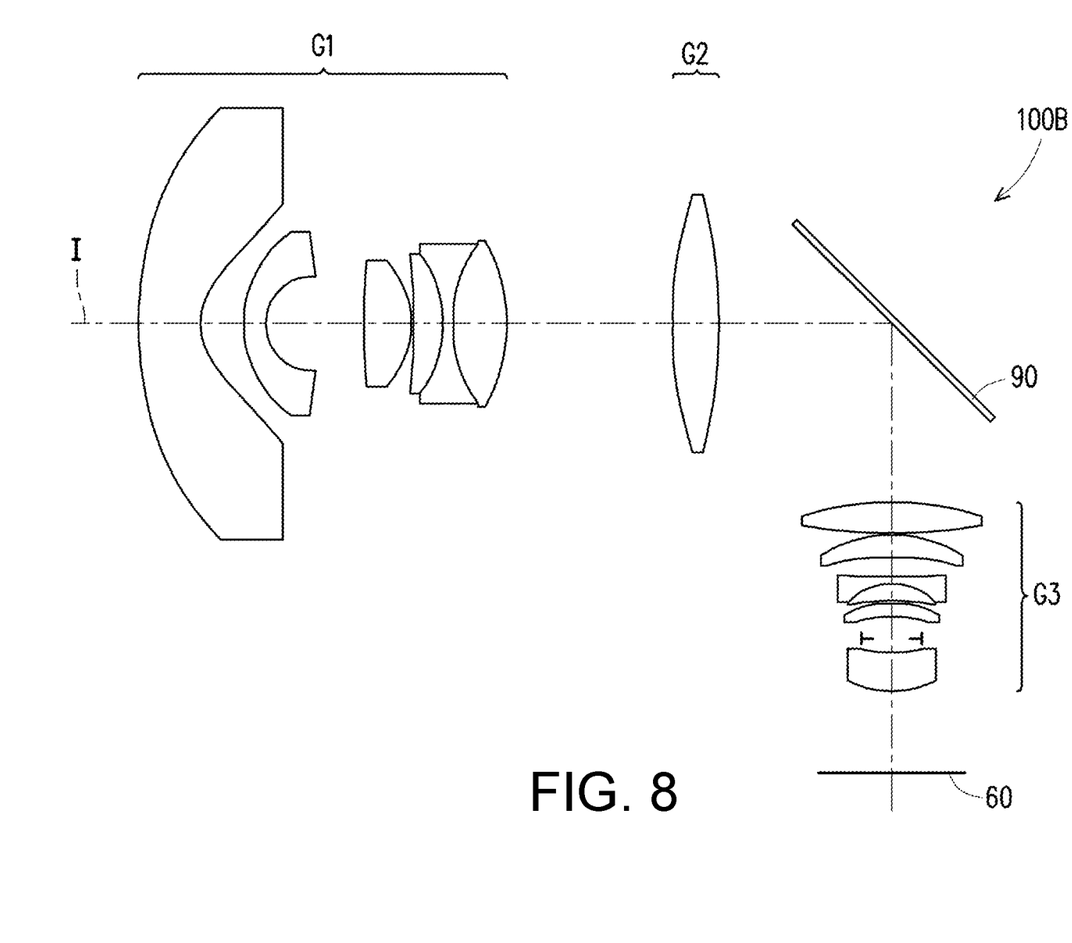
FIG. 8 is a schematic diagram of a projection lens according to still another embodiment of the disclosure.

FIG. 8 is a schematic diagram of a projection lens according to still another embodiment of the disclosure. Referring to FIG. 8, a projection lens 100B shown in FIG. 8 can at least replace the projection lens 100 shown in FIG. 1. Therefore, the projection lens 100B applied in the projection device 10 of FIG. 1 will be described below as an example. However, the disclosure is not limited thereto. The projection lens 100B of the embodiment is similar to the projection lens 100 illustrated in FIG. 2. A difference between these two is that in the embodiment, the projection lens 100B further includes a reflecting element 90 disposed between the second lens group G2 and the third lens group G3. The reflecting element 90 is, for example, a reflecting mirror. Therefore, the projection lens 100B may change a light path of a beam L transmitted through the third lens group G3 by the reflecting element 90, and the beam L thereby returns to the projection lens 100B. In other words, in the projection lens 100B, the optical axis between the second lens group G2 and the third lens group G3 has turns and is not a single straight line. In this way, the projection lens 100B is applicable to different types of projectors, and the disposition of the reflecting element 90 reduces the total length of the projection lens 100B. In other embodiments, the reflecting element 90 may be a prism according to an optical path configuration in different types of projectors, and the disclosure is not limited thereto.

In summary, the embodiments of the disclosure at least have one of the following advantages or effects. In the projection lens and the projection device of the disclosure, the projection lens includes the first lens group, the second lens group, and the third lens group, and the refractive powers thereof are positive, positive, and positive, respectively. Therefore, the number of lenses can be effectively reduced to reduce the length of the projection lens. In addition, the projection lens enables the light emitted by the light valve to form the intermediate image between the first lens group and the third lens group. Therefore, good optical quality is provided under the requirements of fixed focus and ultra short focus.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A projection lens, comprising a first lens group, a second lens group and a third lens group arranged in sequence along an optical axis from a magnification side to a reduction side, wherein:
the first lens group comprises a plurality of lenses having refractive power;
the second lens group comprises at least one lens having refractive power; and
the third lens group comprises a diaphragm, and a plurality of lenses having refractive power;
wherein an intermediate image is formed between the first lens group and the third lens group, and the refractive powers of the first lens group, the second lens group, and the third lens group are positive, positive, and positive, respectively,
wherein the first lens group consists of six lenses having refractive power, and the refractive powers of the six lenses are, from the magnification side to the reduction side, negative, negative, positive, positive, negative, and positive, respectively.

2. The projection lens according to claim 1, wherein number of lenses having refractive power in the projection lens is smaller than or equal to 15.

3. The projection lens according to claim 1, wherein the projection lens is a fixed-focus lens.

4. The projection lens according to claim 1, wherein a throw ratio of the projection lens is less than or equal to 0.4.

5. The projection lens according to claim 1, wherein the projection lens has a non-telecentric property.

6. The projection lens according to claim 1, wherein when the projection lens is focusing, the third lens group is fixed, and the first lens group and the second lens group are configured to move along the optical axis.

7. The projection lens according to claim 1, wherein the projection lens satisfies 0.62>DLT1/DLT2>0.2, wherein DLT1 is a distance from the first lens group to the second lens group, and DLT2 is a distance from the second lens group to the third lens group.

8. The projection lens according to claim 1, wherein the projection lens satisfies 0.4>EFLG1/EFLG3>0.3, wherein EFLG1 is an equivalent focal length of the first lens group, and EFLG3 is an equivalent focal length of the third lens group.

9. The projection lens according to claim 1, wherein the projection lens satisfies 0.27>EFLG1/EFLG2>0.15, wherein EFLG1 is an equivalent focal length of the first lens group, and EFLG2 is an equivalent focal length of the second lens group.

10. The projection lens according to claim 1, wherein the intermediate image is located between the first lens group and the second lens group.

11. The projection lens according to claim 1, wherein the intermediate image is located between the second lens group and the third lens group.

12. The projection lens according to claim 1, wherein the first lens group comprises at least one aspheric lens.

13. The projection lens according to claim 1, wherein the first lens group comprises a triple cemented lens.

14. The projection lens according to claim 1, wherein number of the at least one lens having refractive power in the second lens group is one.

15. The projection lens according to claim 1, wherein the third lens group comprises at least one aspheric lens.

16. The projection lens according to claim 15, wherein number of the at least one aspheric lens is one, and the aspheric lens is a lens closest to the diaphragm and having refractive power.

17. The projection lens according to claim 1, wherein the third lens group comprises six lenses having refractive power, and the refractive powers of the six lenses are, from the magnification side to the reduction side, positive, positive, negative, positive, positive, and positive, respectively.

18. The projection lens according to claim 1, further comprising:
a reflecting element disposed between the second lens group and the third lens group.

19. A projection device, comprising an illumination system, at least one light valve, and a projection lens, wherein:
the illumination system is configured to provide an illumination beam;
the at least one light valve is disposed on a transmission path of the illumination beam and is configured to convert the illumination beam to an image beam; and
the projection lens is disposed on a transmission path of the image beam, and is configured to convert the image beam to a projection beam, wherein the projection lens comprises a first lens group, a second lens group and a third lens group arranged in sequence along an optical axis from a magnification side to a reduction side, wherein:
the first lens group comprises a plurality of lenses having refractive power;
the second lens group comprises at least one lens having refractive power; and
the third lens group comprises a diaphragm, and a plurality of lenses having refractive power;
wherein an intermediate image is formed between the first lens group and the third lens group, and the refractive powers of the first lens group, the second lens group, and the third lens group are positive, positive, and positive, respectively,
wherein the first lens group consists of six lenses having refractive power, and the refractive powers of the six lenses are, from the magnification side to the reduction side, negative, negative, positive, positive, negative, and positive, respectively.

* * * * *